Dec. 15 1925.
P. J. FITZGERALD
GASKET
Filed Nov. 4, 1922
1,565,918
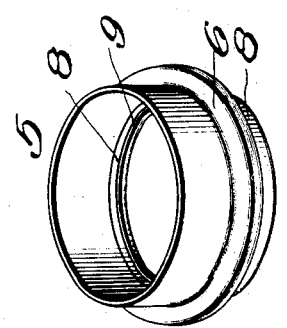
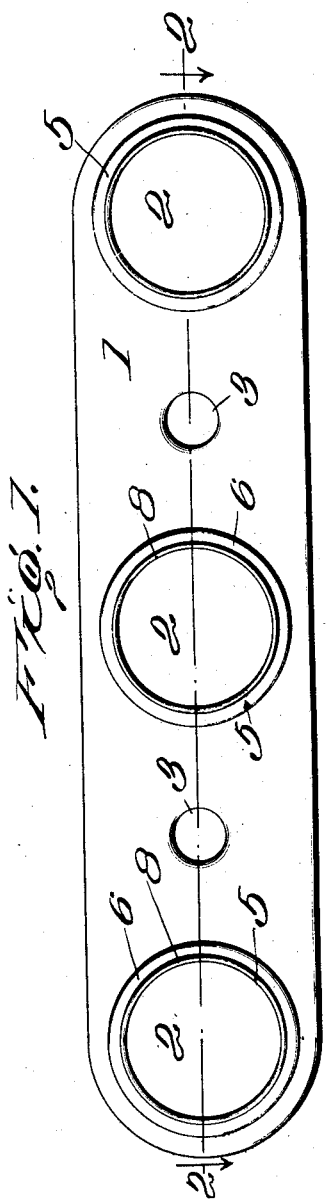
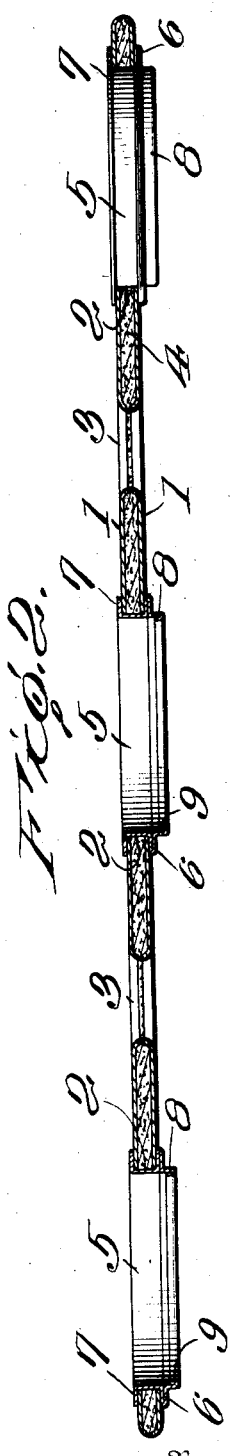
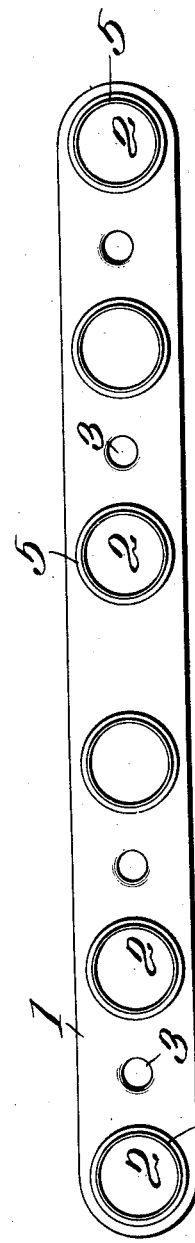
Inventor
Patrick J. Fitzgerald
Sturtevant & Mason
Attorneys Patented Dec. 15, 1925.

1,565,918

UNITED STATES PATENT OFFICE.

PATRICK J. FITZGERALD, OF TORRINGTON, CONNECTICUT, ASSIGNOR TO THE FITZGERALD MANUFACTURING COMPANY, OF TORRINGTON, CONNECTICUT, A CORPORATION OF CONNECTICUT.

GASKET.

Application filed November 4, 1922. Serial No. 599,102.

*To all whom it may concern:*

Be it known that I, PATRICK J. FITZGERALD, a citizen of the United States, residing at Torrington, in the county of Litchfield, State of Connecticut, have invented certain new and useful Improvements in Gaskets, of which the following is a specification.

The invention relates to gaskets and more particularly to a gasket for the manifold of automobile engines of the Ford type.

The object of the invention is to provide a gasket in which there are a plurality of openings to register with the ports of a Ford engine and the manifold, so that all six ports may be packed by either one or two of the gaskets instead of a separate gasket for every port; the two metallic sheets or plates of each gasket being bound together by thimbles, each having flanges overlying opposite sides of the sheets and provided with an integral tubular guide-forming extension.

This object I accomplish by the construction shown in the drawing, in which—

Figure 1 shows a face view or plan of the gasket having three ports or openings;

Fig. 2 is a cross section on the line 2—2 of Fig. 1:

Fig. 3 is a perspective of one of the thimbles;

Fig. 4 is a face view or plan of a gasket having six ports or openings.

The gasket is formed of two superposed plates 1, 1, preferably of copper provided with registering central and end port openings or apertures 2, 2, and with bolt openings 3, 3 between the central and end openings. Between these two plates 1, 1 lies an asbestos sheet 4, similarly apertured.

The copper and asbestos sheets are bound together by the one part sheet metal thimbles 5, also preferably of copper. Each thimble 5 is formed with an external flange 6 between its ends to engage the outer surface of one plate 1, and one end of the thimble 5 is then spun or bent over the outer surface of the other plate 1 to form the flange 7. This leaves the other end of the one piece thimble 5 with an extension forming an annular guide flange 8. These guide flanges 8 enter the engine ports and serve to hold the gasket in position, while the manifold is being bolted in place. In order to prevent bending of the guide flange 8, the outer edge thereof is bent inwardly upon itself, as shown at 9, so that there is a double thickness of metal at this point.

Three ports may be simultaneously packed by a single gasket.

While the gasket shown is especially adapted for Ford engines, the main feature of the one piece, double flanged securing thimble with its integral guide flange may be employed advantageously in other gaskets. However, it is highly advantageous to have a gasket which will cover the space between the manifold and three ports instead of a separate one for every port.

In Figure 4 the gasket has six openings or apertures 2, 2, bolt openings 3 and thimbles 5, formed exactly as in Figs. 1 and 2.

This six-ported gasket is adapted to register with all six engines and manifold ports.

Having thus described my invention, what I claim as new and desire to secure by Letters Patent, is:

A gasket for manifolds comprising superimposed apertured metal plates, an intermediate layer of apertured packing material, and one-piece thimbles for securing the plates of the gasket against the packing material, each thimble having at one end thereof a flange overlying the edge of the plate around the aperture in which the thimble is inserted, said thimble being of considerably greater length than the thickness of the packing and plates so as to project from the face of the gasket for centering the same in the ports when applied to an engine, said thimble intermediate its end and said flange being bent so as to form a projecting flange which is substantially parallel with the flange on the end of the thimble, and so disposed as to clamp the opposite face of the gasket from that engaged by said flange on the end.

In testimony whereof, I affix my signature.

PATRICK J. FITZGERALD.